(12) United States Patent
Xi et al.

(10) Patent No.: US 11,230,485 B2
(45) Date of Patent: Jan. 25, 2022

(54) METHOD AND DEVICE FOR PREVENTING AND CONTROLLING POLLUTANTS IN BASIN WATER RESOURCE UTILIZATION

(71) Applicant: CHINESE RESEARCH ACADEMY OF ENVIRONMENTAL SCIENCES, Beijing (CN)

(72) Inventors: Beidou Xi, Beijing (CN); Lei Wang, Beijing (CN); Jinsheng Wang, Beijing (CN); Yali Zhang, Beijing (CN); Wenbing Tan, Beijing (CN); Tongtong Li, Beijing (CN); Yangyang Wang, Beijing (CN); Hui Liu, Beijing (CN); Qian Zhang, Beijing (CN); Feng Wu, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 57 days.

(21) Appl. No.: 16/770,741

(22) PCT Filed: Dec. 12, 2018

(86) PCT No.: PCT/CN2018/120538
§ 371 (c)(1),
(2) Date: Jun. 8, 2020

(87) PCT Pub. No.: WO2019/114742
PCT Pub. Date: Jun. 20, 2019

(65) Prior Publication Data
US 2021/0171379 A1 Jun. 10, 2021

(30) Foreign Application Priority Data
Dec. 13, 2017 (CN) .......................... 201711332295.2

(51) Int. Cl.
*C02F 9/00* (2006.01)
*C02F 1/28* (2006.01)
(Continued)

(52) U.S. Cl.
CPC ................. *C02F 9/00* (2013.01); *C02F 1/281* (2013.01); *C02F 1/283* (2013.01); *C02F 1/288* (2013.01);
(Continued)

(58) Field of Classification Search
None
See application file for complete search history.

(56) References Cited

U.S. PATENT DOCUMENTS 7,641,802 B2 * 1/2010 Yamasaki .............. B01D 65/08
210/748.14

FOREIGN PATENT DOCUMENTS

CN 103739167 B * 5/2015
CN 105621794 A * 6/2016

OTHER PUBLICATIONS

Vásquez-Piñeros, M.A., Martinez-Lavanchy, P.M., Jehmlich, N. et al. *Delftia* sp. LCW, a strain isolated from a constructed wetland shows novel properties for dimethylphenol isomers degradation. BMC Microbiol 18, 108 (2018). https://doi.org/10.1186/s12866-018-1255-z(Year: 2018).*

* cited by examiner

*Primary Examiner* — Chester T Barry
(74) *Attorney, Agent, or Firm* — CBM Patent Consulting, LLC

(57) ABSTRACT

The present invention relates to a method and a device for preventing and controlling pollutants in basin water resources utilization. The method includes: providing a hydrolysis tank (1), a nano-aeration tank (2) and a vertical (Continued)

subsurface flow constructed wetland (3) connected in sequence, salvaging duckweed and algae in the basin, then crushing, acidizing and digesting them in the hydrolysis tank (1), importing the supernatant obtained in the hydrolysis tank (1) into the nano-aeration tank (2), then mixing the water from the nano-aeration tank (2) with basin water and importing them into the vertical subsurface flow constructed wetland (3), treating to obtain basin water meeting the irrigation requirements.

10 Claims, 1 Drawing Sheet

(51) Int. Cl.
     *C02F 3/10*      (2006.01)
     *C02F 3/26*      (2006.01)
     *C02F 3/30*      (2006.01)
     *C02F 3/32*      (2006.01)
     *C02F 3/34*      (2006.01)
     *C02F 101/10*      (2006.01)
     *C02F 101/16*      (2006.01)
     *C02F 101/20*      (2006.01)
     *C02F 101/30*      (2006.01)

(52) U.S. Cl.
     CPC .............. *C02F 3/102* (2013.01); *C02F 3/108* (2013.01); *C02F 3/26* (2013.01); *C02F 3/308* (2013.01); *C02F 3/327* (2013.01); *C02F 3/34* (2013.01); *C02F 2101/105* (2013.01); *C02F 2101/16* (2013.01); *C02F 2101/20* (2013.01); *C02F 2101/30* (2013.01); *C02F 2203/006* (2013.01); *C02F 2305/023* (2013.01)

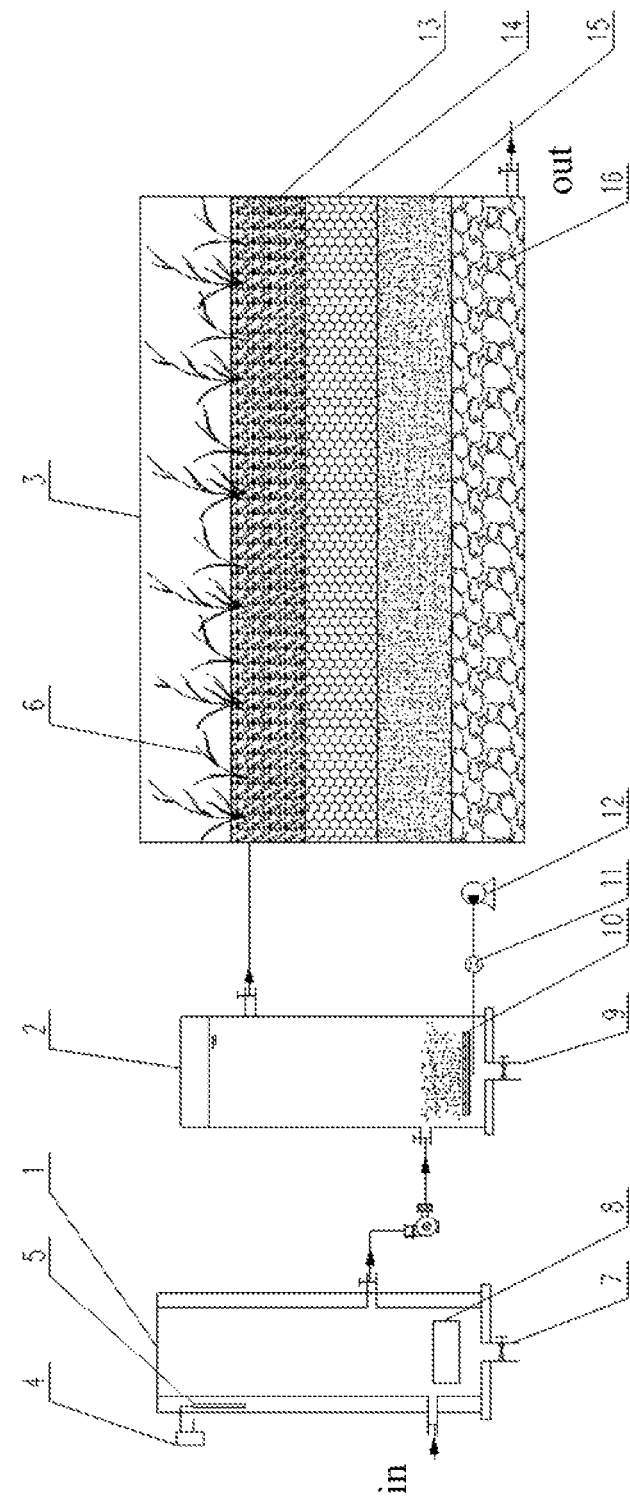

METHOD AND DEVICE FOR PREVENTING AND CONTROLLING POLLUTANTS IN BASIN WATER RESOURCE UTILIZATION

TECHNICAL FIELD

The invention belongs to the field of basin water utilization, and particularly relates to a method and a device for controlling pollutants in basin water resources utilization in extremely water scarce areas.

BACKGROUND ART

While basin water resources are scarce in China, water pollution is a major issue affecting basin water utilization. The first reason for water pollution is that the untreated or unqualified discharge of domestic sewage increases the total phosphorus, total nitrogen, organic matters and suspended matter in the water body, resulting in eutrophication of basin water; secondly, the effluent of industrial basin water and solid waste is directly discharged into the water body to increase the toxic heavy metals in basin water, causing pollution of heavy metals in basin water. The problem of water pollution is not a single problem. It not only relates to the quality of life and human health of residents, but also relates to the policy coordination between different basins, as well as the interest coordination between mainstreams and tributaries, surface water and groundwater, and upstream and downstream.

The effective utilization coefficient of farmland irrigation water in China is far lower than the world's advanced level, which exposes the problems of extensive agricultural water use and the low efficiency of water resources utilization in China's farmland water conservancy construction, and the corresponding one is the current situation of agricultural water resources shortage. With the rapid progress of industrialization and urbanization, the contradiction of increasing population, decreasing land and water resources shortage in China has become increasingly prominent. How farmland water conservancy construction in China deals with the frequent drought is a long-term strategic task of water conservancy work in China. Taking account of local conditions and overall consideration of basin water irrigation of farmland is an important way to solve the shortage of farmland water.

In recent years, agricultural pollution, such as heavy metal pollution, has attracted more and more attention and understanding. Faced with the current situation of farmland water shortage and basin water, strict water resource management system and water conservation system should be implemented, at the same time, basin water pollutant control technologies such as heavy metal pollutants, as well as harmless available devices should be vigorously developed and promoted. Through the use of various high-tech means such as molecular biology technology, enriching a variety of heavy metals and removing other pollutants such as nitrogen and phosphorus simultaneously, carrying out more efficient ecological management on polluted water bodies, striving to do not affect the environment and at the same time have a certain economic return, making it be a healthy industry with the unified governance and development, and promoting sustainable development of environmentally friendly agriculture with a dual-wheel drive of economic and ecological benefits.

Based on the above situation, it is necessary to develop a method and a device for preventing and controlling pollutants in basin water resources utilization, which can prevent and control the contents of heavy metals and other pollutants in basin water when it is used for farmland irrigation, fundamentally reduce heavy metals and other pollutants in the crop, promote the growth of the crop, maintain sustainable and healthy development of agriculture, and ensure agricultural safety and human safety.

CONTENTS OF THE INVENTION

In order to solve the above problems, the present inventors have conducted intensive studies, and provide a method and a corresponding device for preventing and controlling pollutants in basin water resources utilization. Build a hydrolysis tank, a nano-aeration tank and a vertical subsurface flow constructed wetland at a set distance from basin revetment of the agricultural activity area, acidify and degrade the duckweed and algae through the hydrolysis tank and nano-aeration tank to promote microbial activity, respectively, then remove or degrade heavy metals and other pollutants through the vertical subsurface flow constructed wetland to achieve the purification of basin water and meet the irrigation requirements, thereby completing the present invention.

The object of the present invention is to provide the following technical solutions:

(1) A method for preventing and controlling pollutants in basin water resources utilization, wherein the method includes providing a hydrolysis tank 1, a nano-aeration tank 2 and a vertical subsurface flow constructed wetland 3 connected in sequence;

feeding basin water to be treated into the hydrolysis tank 1 and adding aquatic plants for acidification and digestion, then transporting the supernatant of the treated basin water into the nano-aeration tank 2;

treating the supernatant from the hydrolysis tank 1 in an aerobic environment in the nano-aeration tank 2, and transporting the treated supernatant to the vertical subsurface flow constructed wetland 3;

mixing the supernatant treated by the nano-aeration tank 2 with basin water and feeding them into the vertical subsurface flow constructed wetland 3, and also into one or more layers of fillers laid in the vertical subsurface flow constructed wetland 3 to degrade or remove pollutants.

(2) A device for preventing and controlling pollutants in basin water resources utilization, wherein the device includes a hydrolysis tank 1, a nano-aeration tank 2 and a vertical subsurface flow constructed wetland 3 connected in sequence, which are 4~10 m far from basin revetment;

in the hydrolysis tank 1, aquatic plants are crushed, acidified and digested, and then the supernatant is transported into the nano-aeration tank 2;

in the nano-aeration tank 2, the supernatant from the hydrolysis tank 1 is received, and organic matters in the supernatant are degraded, such as long carbon chain organic matters are degraded into short carbon chain organic matters, thereafter the degraded supernatant is fed into the vertical subsurface flow constructed wetland 3 to provide microorganisms with carbon source;

in the vertical subsurface flow constructed wetland 3, the supernatant from the nano-aeration tank 2 is mixed with basin water, and then is fed into one or more layers of fillers laid in the vertical subsurface flow constructed wetland 3, where pollutions are degraded or removed, and the treated basin water is transported to the farmland.

According to the present invention, the method and the device for preventing and controlling pollutants in basin water resources utilization have the following beneficial effects:

(1) In the present invention, a hydrolysis tank and a nano-aeration tank are built to provide nutrients (mainly a carbon source) to the microorganisms in the vertical subsurface flow constructed wetland, promote the reproduction of microorganisms, and facilitate the dephosphorization and denitrification of the microorganisms in the vertical subsurface flow constructed wetland.

(2) Activated sludge is added to the nano-aeration tank, which has strong adsorption, aggregation and oxidative decomposition capabilities for organic matters, has good self-aggregation and sedimentation performance, and promotes the degradation of long carbon chain organic matters and the sedimentation of suspended matters.

(3) The vertical subsurface flow constructed wetland in the present invention is constructed by laying multiple layers of fillers, and the types of fillers, dosage ratio, particle size and filling height of filler in each layer are specifically selected, so that pollutant treatment processes, such as organic matter degradation, heavy metal adsorption, dephosphorization and denitrification, can be effectively realized in the vertical subsurface flow constructed wetland.

(4) In the present invention, specific aquatic plants are planted in the vertical subsurface flow constructed wetland, which is beneficial to the enrichment of heavy metals, and the obtained aquatic plants enriched with heavy metals can be reused to prepare functional biochar with photocatalytic effect.

(5) In the present invention, the denitrifying bacteria are inoculated in the river channel of the basin. Basin water to be treated will inevitably be further purified by the addition of denitrifying bacteria, especially aerobic denitrifying bacteria. Meanwhile, the synergistic effect of aerobic denitrifying bacteria and anaerobic denitrifying bacteria added in the vertical subsurface flow constructed wetland will promote water purification.

DESCRIPTION OF FIGURES

FIG. 1 shows a schematic diagram of a device for preventing and controlling pollutants in basin water resources utilization according to a preferred embodiment of the present invention.

DESCRIPTION OF THE REFERENCE SIGNS

1—hydrolysis tank;
2—nano-aeration tank;
3—vertical subsurface flow constructed wetland;
4—temperature control device;
5—temperature probe
6—wetland plant
7—sludge discharge hole
8—agitator
9—secondary sludge discharge hole
10—aeration disk
11—flowmeter
12—nano-aerator
13—first layer of filler
14—second layer of filler
15—third layer of filler
16—fourth layer of filler

SPECIFIC EMBODIMENTS FOR CARRYING OUT THE INVENTION

The present invention will be described in more detail through preferred embodiments and examples. Through these descriptions, the features and advantages of the present invention will become clearer.

The term "exemplary" as used herein is intended to be "serving as an example, an illustrative embodiment, or an embodiment". Any of the embodiments described herein as "exemplary" need not be construed as preferred as or better than other embodiments. Although various aspects of the examples are shown in the FIGURES, unless specifically noted, the figures are not necessarily drawn to scale.

Aiming at the water shortage in farmland irrigation in China, a technical route of using basin water for irrigation is proposed. But polluted basin water is untreated, and the pollutants, such as heavy metals, total phosphorus or total nitrogen, may affect crop growth and harvest, more seriously will cause heavy metals in crops to exceed the standard, and the grains to be unusable, thereby cause significant losses.

Based on the above problems, the inventors conducted a lot of research, and provided a method for preventing and controlling pollutants in basin water resources utilization. The method can effectively control the contents of pollutants, such as suspended matters, heavy metals, total nitrogen and total phosphorus in basin water fed into the farmland.

In the present invention, as shown in FIG. 1, the method includes providing a hydrolysis tank 1, a nano-aeration tank 2 and a vertical subsurface flow constructed wetland 3 connected in sequence; feeding basin water to be treated into the hydrolysis tank 1 and adding aquatic plants such as duckweed and algae for acidification and digestion, then transporting the supernatant of the treated basin water into the nano-aeration tank 2, wherein, said aquatic plants such as duckweed and algae can be salvaged from basin water area;

treating the supernatant from the hydrolysis tank 1 in an aerobic environment in the nano-aeration tank 2, such as organic matter degradation and suspended matter sedimentation, and transporting the treated supernatant to the vertical subsurface flow constructed wetland 3;

mixing the supernatant treated by the nano-aeration tank 2 with basin water and feeding them into the vertical subsurface flow constructed wetland 3, and also into one or more layers of fillers laid in the vertical subsurface flow constructed wetland 3 to degrade or remove pollutants, such as organic matter degradation, heavy metal fixation and removal, suspended matter filtration, denitrification and dephosphorization, then treated basin water meeting the requirements of farmland irrigation water quality is sent to the farmland for irrigation.

In the present invention, the temperature in the hydrolysis tank 1 is measured by a temperature probe 5 of a temperature control device 4, and is controlled to the set temperature; preferably, the hydrolysis tank 1 is a container with an interlayer. There is a heat transfer medium in the interlayer, so the temperature of the heat transfer medium is measured by the temperature probe 5 of the temperature control device 4 to control the temperature in the hydrolysis tank 1.

In the present invention, a sludge discharge hole 7 is set at the bottom of the hydrolysis tank 1. There is unavoidable sludge in basin water, and the acidification and digestion of aquatic plants such as duckweed or algae will inevitably produce waste residue. The setting of the sludge discharge hole 7 facilitates the discharge of the sludge and reduces the invalid occupation of the space in the hydrolysis tank 1.

In a preferred embodiment, the hydrolysis tank 1 is equipped with an agitator 8, so that aquatic plants, such as duckweed and algae, can be crushed to speed up the acidification and digestion process.

In a preferred embodiment, when the COD of the supernatant of the hydrolysis tank 1 is higher than 200 mg/L, it is considered that the degree of decomposition of duckweed and algae in the hydrolysis tank 1 is good, and the level of carbon chain organic matters meets the needs of microbial reproduction in subsequent processing.

In the present invention, an aeration disk 10 is set at the lower part of the nano-aeration tank 2, and an oxygen-containing fluid is introduced through the aeration disk 10 into the nano-aeration tank 2. Furthermore, the oxygen-containing fluid is nano-bubble water or the aqueous solution containing tiny bubbles with a size of 100~500 nm, and dissolved oxygen amount of 10~25 mg/L.

Due to the small size and the large specific surface area of the bubbles in the nano-bubble water, they can show characteristics different from ordinary bubbles. For example, the residence time of the bubbles in the device is long due to their small volume. When the bubbles slow rise, both the zeta potential and the specific surface area increase (when ordinary bubbles rise, their volume increases and their specific surface area decreases; while the specific surface area of nano-bubbles increases during they rise, due to a self-pressurizing effect of the internal gas of nano-bubbles because of the surface tension). Active oxygen radicals, such as hydroxyl radicals are generated after the bubbles collapse, thereby efficiently degrading long carbon chain organic matters in water; and the high temperature generated at the moment of collapse is also conducive to the degradation of long carbon chain organic matters.

In a preferred embodiment, the pore diameter on the aeration disk 10 is a nano-aperture, that is, the aeration disk 10 is a nano-aeration disk, and it can be set to further ensure the oxygen entering the nano-aeration tank 2 to be nano-sized bubbles. The aeration disk 10 is connected to a flowmeter 11 and a nano-aerator 12 in sequence through a pipeline. The oxygen-containing fluid is supplied through the nano-aerator 12 to the aeration disk 10, and the flow rate (or the amount of oxygen) of the oxygen-containing fluid feeding into the nano-aeration tank 2 can be effectively controlled by the flowmeter 11.

In a preferred embodiment, activated sludge is added into the nano-aeration tank 2, and the weight ratio of the activated sludge to basin water fed into the nano-aeration tank 2 is 1:7. Activated sludge is brown floc with aerobic microorganisms as the main body, which has strong adsorption, aggregation and oxidative decomposition capabilities for organic matters, and has good self-aggregation and sedimentation performance, so suspended particles in basin water can be reduced.

Meanwhile, the weight ratio (namely 1:7) of activated sludge to basin water fed into the nano-aeration tank can ensure high treatment efficiency and rapid clarification of basin water. When the weight ratio is greater than 1:7, the activated sludge increases and the microbial activity is high, which can realize high-efficiency decomposition of organic matters and sedimentation of particulate matters, but it takes longer time for basin water to become clear to obtain the supernatant; when the weight ratio is less than 1:7, there is more basin water and less activated sludge, which will inevitably affect the degradation efficiency of organic matters and the sedimentation of suspended matters.

Preferably, microorganisms are added in the nano-aeration tank 2, and said microorganism is *Delftia* sp., which belongs to the genus *delftia*. Long carbon chain organic matters are used as the carbon source by the bacteria of *Delftia* sp. for growth, so the addition of *Delftia* sp. can promote the degradation of long carbon chain organic matters. This genus belongs to aerobic denitrifying bacteria with strong adaptability, fast growth rate, high yield, and fast and thorough denitrification, thus has important application value in environmental pollution control and bioremediation.

In a preferred embodiment, long carbon chain organic matters can be effectively degraded in the nano-aeration tank 2, so that the average molecular weight of organic matters in water from the nano-aeration tank 2 is lower than 308.24 Da, and preferably lower than 254.50 Da.

In the present invention, a secondary sludge discharge hole 9 is set at the bottom of the nano-aeration tank 2 to facilitate the discharge of sludge and activated sludge in basin water.

A carbon source is required with the growth of microorganisms, especially short chain carbon source is more convenient for the absorption and utilization of microorganisms. However, there are fewer short chain organic matters in basin water, and the growth and reproduction of microorganisms placed in the vertical subsurface flow constructed wetland 3 are bound to be affected. The hydrolysis tank 1 and the nano-aeration tank 2 are built to provide nutrients (mainly the carbon source) to the microorganisms in the vertical subsurface flow constructed wetland 3, to promote the reproduction of microorganisms, and to facilitate the activities of the microorganisms such as dephosphorization and denitrification in the vertical subsurface flow constructed wetland 3.

According to the present invention, the supernatant from the nano-aeration tank 2 and basin water to be purified are introduced in the vertical subsurface flow constructed wetland 3, and then are fed into one or more layers of fillers laid in the vertical subsurface flow constructed wetland 3 to degrade or remove pollutions, including organic matter degradation, heavy metal fixation and removal, denitrification dephosphorization, and suspended matter filtration. Wherein, the ratio of the amount of the water from the nano-aeration tank 2 to that of basin water is ≤1:1, and preferably is 1:2~1:50, that is, the amount of basin water fed into the vertical subsurface flow constructed wetland 3 is not less than that of the water from the nano-aeration tank 2, thereby improving the microbial activity in the vertical subsurface flow constructed wetland 3 and balancing basin water treatment efficiency.

In a preferred embodiment, the vertical subsurface flow constructed wetland 3 is provided with three to six layers of fillers from top to bottom, and the filler of each layer may be selected from one or more of soil, biochar, functional biochar, ore particles such as gravel, natural zeolite, volcanic stone, calcite, limestone, pebbles, and so on, diatomaceous earth or Flory diatomaceous earth.

In a preferred embodiment, the vertical subsurface flow constructed wetland 3 is provided with four layers of fillers from top to bottom:

the first layer of filler 13 adsorbs heavy metals and degrades organic matters;

the second layer of filler 14 adsorbs and fixes heavy metals;

the third layer of filler 15 adsorbs heavy metals, and phosphorus-accumulating bacteria is added in this area to reduce the phosphorus content of basin water to be purified because of the phosphorus-accumulating ability;

the fourth layer of filler 16 adsorbs heavy metals, and phosphorus-accumulating bacteria is allowed to dephosphorize in this area by constructing an anaerobic environment, so its phosphorus-accumulation ability in the third layer of filler 15 is promoted. An baerobic denitrifying bacteria is added to reduce the nitrogen content of basin water to be purified.

In a preferred embodiment of the present invention, the first layer of filler 13 is laid at 0-500 cm, and the first layer of filler 13 is a mixed filler of soil and functional biochar, and the mixing ratio is 3:(6~8), and preferably 3:7.

Wherein, biochar is a high-carbon-content material obtained from biomass after high temperature treating and deoiling under anoxic conditions. Functional biochar is biochar loaded with transition metals.

Functional biochar has the following characteristics of biochar:

(1) In term of microstructure, it has characteristics of porosity, and biochar has a controlled porosity compared to other materials, namely micropores (<0.9 nm), small pores (<2 nm) and large pores (>50 nm). The large pores can ensure the aeration and water retention capacity of the soil used with it, and also provide a place for microorganisms to survive and reproduce, thereby improving the activity and reproduction rate of the microorganisms; micropores and small pores affect the adsorption and transfer of molecules by biochar, and the pore structure of biochar can reduce the rate of water penetration and enhance the adsorption capacity of soil for nutrients that are highly mobile and easily leached; therefore, its porous structure is conducive to the growth of plants on the first layer of filler.

(2) The porosity of biochar determines its large surface area, and a large amount of organic matters in the regional water can be adsorbed, which is conducive to the degradation of organic matters after adsorption.

(3) The surface of the biochar has carboxyl, phenolic hydroxyl, and carbonyl oxygen-containing functional groups. The biochar has higher cation exchange capacity because of negative surface charges generated by the above functional groups, and thus can effectively adsorb heavy metal ions in basin water.

It is worth noting that, in addition to the above-mentioned characteristics of biochar, functional biochar is loaded with transition metals (such as nickel, cobalt and iron), therefore water molecules or hydroxides adsorbed on the surface of functional biochar are oxidized in the presence of oxygen through the photocatalysis of transition metals to generate active oxygen such as hydroxyl radical (.OH), and thus organic pollutants are degraded, desulfurized (S), and dechlorinated (Cl), thereby reducing their toxicity and odor.

In the present invention, the first layer of filler 13 is mainly composed of functional biochar, and the soil is added as an auxiliary, which is beneficial to the planting of the plants on the first layer of filler 13. After experiments, it was found that when the soil and the functional biochar were mixed with a weight ratio of 3:(6~8), good growth of plants could be achieved due to the fixation of the activated carbon to the soil, and a large amount of organic matters can be absorbed by the filler with the functional biochar as main part, then be effectively degraded through the photocatalysis of transition metal ions. If the weight ratio of soil to functional biochar is less than 3:8, namely the ratio of soil decreases, plants grow slowly due to lack of necessary nutrients. If the weight ratio of soil to functional biochar is more than 3:6, the photocatalytic effect is reduced, so the degradation efficiency of organic matters decreases.

In a further preferred embodiment, the particle size of the filler in the first layer of filler 13, especially of the functional biochar, is 0.10-0.30 cm. Within this particle size range, the support of functional biochar to the soil is beneficial for air to enter the filler layer, and the plant roots are effectively contacted with air, which is beneficial to the growth of aquatic plants planted on the first layer of filler 13. The functional biochar located in the lower part of the water body undergoes photocatalytic reaction in the presence of oxygen to achieve effective degradation. If the particle size of the functional biochar is less than 0.10 cm, it is unfavorable for air to enter the filler layer, and is also unfavorable for plant growth and degradation of organic pollutants because of the lack of oxygen. If the particle size of the functional biochar is greater than 0.30 cm, the larger particle size is not conducive to photocatalytic efficiency due to the smaller surface area.

In a further preferred embodiment, wetland plants 6, preferably Siberian iris and Zaili flower, are planted on the first layer of filler 13. Siberian irises and Zaili flower can grow normally in eutrophic water bodies, showing good water purification effects. The values of total nitrogen, total phosphorus, and chemical oxygen demand (COD) in water can be effectively reduced through plant absorption, volatilization, root filtration, degradation, stabilization and so on. Siberian irises and Zaili flower show extremely high enrichment capacity for heavy metals, and the accumulation of heavy metals in the two plants is more than 100 times that of ordinary aquatic plants, while their normal growth is not affected. Heavy metals can be completely removed from the water body by harvesting plants. Therefore, these two wetland plants are selected for planting, which is an effective ecological method for reducing heavy metals.

In a further preferred embodiment, functional biochar can be obtained by carbonizing, activating, deoiling, reducing and drying the wetland plants 6 (Siberian iris and Zaili flower) grown in vertical subsurface flow constructed wetland.

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode, and biochar has higher electric capacity and photocatalytic ability.

In a preferred embodiment, one of rhamnolipid, aspartic acid or polyaspartic acid or a combination thereof, preferably the combination of rhamnolipid and aspartic acid, is added during the growth process of wetland plants 6, to promote the enrichment of heavy metals in plants, so that the concentration of heavy metals in the plant could be as high as possible. Rhamnolipid and polyaspartic acid have good biocompatibility and biodegradability. As water-soluble biosurfactant, rhamnolipid can promote the dissolution of heavy metals adsorbed by soil, etc. through emulsification and solubilization, which is beneficial to plant absorption. (Poly)aspartic acid can chelate and activate heavy metal ions, thus can dissolve the heavy metals adsorbed by soil and so on, and at the same time, it also can effectively promote plant growth, which is different from other chelating agents. By using rhamnolipid and (poly)aspartic acid mixed in a set ratio, plants can effectively enrich heavy metals.

Preferably, the concentration of rhamnolipid in basin water to be treated is 1-20 mg/L, and the concentration of polyaspartic acid in basin water to be treated is 1-25 mg/L.

In a preferred embodiment of the present invention, the second layer of filler 14 is laid at 500-1000 cm, and the second layer of filler 14 is a mixed filler of soil, natural zeolite and limestone, with the mixing ratio of 1:(2~3): (0.5~1), and preferably 1:2:0.5.

Zeolite is the general term of water-containing porous aluminosilicate, and its crystal is mainly composed of (SiO) tetrahedron. The overall framework of the zeolite molecule is formed by $Al^{3+}$ and $Si^{4+}$ as framework ions and oxygen atoms together, and part of $Si^{4+}$ is replaced by $Al^{3+}$, resulting in excess negative charge. At the same time, there are cavities and channels in the zeolite framework with certain pore size, which determines its adsorption and ion exchange properties. Its adsorption of ammonia nitrogen and the adsorption and fixation of heavy metals have greater advantage than other ore raw materials.

Limestone also has more pore structures, so it can effectively adsorb heavy metals. At the same time, the acidity and alkalinity of water can be effectively regulated by limestone, and it play an important role in the growth of plants in the upper filler and the reproduction of microorganisms in water (phosphorus-accumulating bacteria multiply at pH 5~pH 9, and nitrifying bacteria and denitrifying bacteria multiply at pH 6.0~pH 8.5). Meanwhile, limestone can strongly absorb fluoride ions, which effectively reducing the content of fluorine in water.

The soil also provides support for wetland plants 6 in constructed wetlands. At the same time, studies have shown that due to the presence of clay minerals, oxides and soil organic matters in the soil, the soil has a tendency to enrich heavy metals, making its ability to adsorb heavy metal ions not to be underestimated.

After a lot of experimental research, the mixing ratio of the soil, natural zeolite and limestone in the second layer of filler 14 is 1:(2~3):(0.5~1), within this range, the adsorption and fixation of most heavy metals and the adjustment of the pH value of water can be realized. If the proportion of soil increases, the adsorption capacity of heavy metals decreases due to the weaker adsorption effect of soil to heavy metals than those of natural zeolite and limestone; on the contrary, nutrient reserves of plant growth may be affected. If the proportion of the natural zeolite increases, the adsorption of heavy metals increases, and correspondingly the amount of soil or limestone decreases, which also has a threat to plant growth or the regulation of the pH value of water. Similarly, the increase of the proportion of limestone is beneficial to the adjustment of the pH value of water, but the effect of other components is reduced accordingly; on the contrary, the pH value of water cannot be adjusted quickly and effectively, thereby affecting the functional activities of microorganisms.

In a further preferred embodiment, the particle size of the filler in the second layer of filler 14 is 0.08-0.1 cm, which is equal to or lower than that of the functional biochar in the first layer of filler 13, and is equal to or higher than the particle size in the third layer of filler 15. This particle size range is chosen under considering the coordination of gas circulation and total metal adsorption. When the particle size is less than 0.08 cm, although the adsorption of heavy metals is promoted, it is not beneficial to the phosphorus accumulation of the phosphorus-accumulating bacteria placed in the third layer of filler 15 due to increased packing density and poor air circulation. When the particle size is higher than 0.1 cm, air circulation is promoted, but corresponding heavy metal adsorption capacity is significantly reduced compared to that with particle size of 0.08 cm.

In a preferred embodiment of the present invention, the third layer of filler 15 is laid at 1000~1500 cm, and the third layer of filler 15 is a mixed filler of fly ash molecular sieve, Flory diatomaceous earth and biochar with the mixing ratio of 1:(3~4):(1~1.5), and preferably 1:3:1.

In the present invention, three kinds of porous fillers, namely fly ash molecular sieve, Flory diatomaceous earth and biochar are used to adsorb heavy metals in the deep layer of vertical subsurface flow constructed wetland. The common feature of the three is the high porosity, which is convenient for the biofilm formation of microorganisms. Wherein, fly ash is used as a molecular sieve, based on the fact that the main components of fly ash are similar to those of molecular sieves. Fly ash is currently treated as waste, because it contains heavy metal ions, such as Cr, Hg, As and Pb, and will pollute air, water, soil and so on. If fly ash is used as molecular sieve, its cation exchange characteristics and pore structure are beneficial to achieve the adsorption of heavy metals, thereby the source of pollution is used effectively.

Biochar with large surface area also has excellent heavy metal adsorption capacity.

Compared with ordinary diatomaceous earth, Flory diatomaceous earth has larger pore volume, larger specific surface area, and stronger adsorption of heavy metals and organic pollutants. In particular, Flory diatomaceous earth has a depth effect, that is, in deep filtration, the separation process only occurs in the "inside" of the medium, and some of the relatively small impurity particles that pass through the surface of Flory diatomaceous earth are blocked by the tortuous micropore structure and the finer pores inside diatomaceous earth. When the particles hit the wall of the channel, it is possible to escape from the flow. The nature of Flory diatomaceous earth is beneficial to the long-term retention of bacterial microorganisms in this area, which facilitates the placement of microorganisms.

Since the fly ash molecular sieve, Flory diatomaceous earth and biochar have different adsorption advantages for different heavy metals, the mixing ratio of fly ash molecular sieve, Flory diatomaceous earth and biochar is 1:(3~4): (1~1.5), which is beneficial to the placement of microorganisms, thereby improving the adsorption of various heavy metal ions.

In a preferred embodiment, the particle sizes of fly ash molecular sieve, Flory diatomaceous earth and biochar are 0.05-0.08 cm. Due to the high porosity of the above three fillers, within this small particle size range, it is beneficial to the adsorption of heavy metal ions and the biofilm formation of microorganisms.

In a preferred embodiment, phosphorus-accumulating bacteria is added in the third layer of filler 15 to reduce the phosphorus content of basin water to be purified. Said phosphorus-accumulating bacteria is selected from one or more of *Acinetobacter, Aeromonas* and *Pseudomonas*, and preferably *Pseudomona alcaligenes*.

Under aerobic conditions, free oxygen is used as the electron acceptor by phosphorus-accumulating bacteria to oxidize β-hydroxy butyric acid (PHB) stored in cells, and the energy generated by this reaction is used to excessively take up phosphate from water to synthesize the high-energy substance adenosine triphosphate (ATP), wherein a part of which is provided for bacterial synthesis and life-sustaining activities, and another part of which is used to synthesize polyphosphate which accumulated in bacterial cells. Under anaerobic conditions, the phosphorus-accumulating bacteria decompose the polyphosphate in the body and produce ATP. Phosphorus is released by the phosphorus-accumulating bacteria under anaerobic conditions. The amount of aerobic phosphorus accumulating is greater than that of anaerobic phosphorus releasing, thus the phosphorus content of basin water can be effectively controlled by inputting the phosphorus-accumulating bacteria.

In a preferred embodiment of the present invention, the fourth layer of filler 16 is laid at 1500~2000 cm, the fourth layer of filler 16 is a mixed filler of pebbles and biochar with the mixing weight ratio of 1:(1~2), and preferably 1:1. Pebbles also have the ability to adsorb heavy metals, and are cooperated with biochar to synergistically adsorb heavy metals.

In a further preferred embodiment, the particle size of the filler in the fourth layer of filler 16 is 0.30-0.50 cm. Larger gaps will be formed between the fillers due to their larger particle size, which facilitates the circulation of the introduced microorganisms. Because the particle size of the filler in the third layer of filler 15 is relatively small, the microorganisms are restricted to enter the fourth layer of filler 16 to a certain extent. If the particle size of the filler in the fourth layer of filler 16 is also reduced, the phosphorus-accumulating bacteria cannot effectively travel to and from the third and fourth layers of filler, which is not beneficial to the process of phosphorus-accumulating and -releasing.

In a further preferred embodiment, the fourth layer of filler 16 is an anoxic or anaerobic environment, and anaerobic denitrifying bacteria, preferably heterotrophic anaerobic denitrifying bacteria, are added to the fourth layer of filler 16.

$NO_3^-$ can be gradually converted to $NO_2^-$, NO, $N_2O$ and $N_2$ by the denitrifying bacteria, and gets out of the water system, thereby achieving the purpose of denitrification. Although certain nitrifying bacteria and denitrifying bacteria are present in basin water, some denitrifying bacteria are added in basin water in present invention to further improve the denitrification efficiency.

In a further preferred embodiment, phosphorus-accumulating bacteria is added to the fourth layer of filler 16. Phosphorus is released by the phosphorus-accumulating bacteria under anaerobic conditions, and the phosphorus releasing under this condition will promote better phosphorus accumulation under aerobic conditions in the third layer of filler.

In order to achieve and maintain the anaerobic or anaerobic environment in the fourth layer of filler, a polar polymer film, such as polyaniline film, is filled between the third layer of filler 15 and the fourth layer of filler 16. The polar polymer polyaniline film has unique functions of water permeability and air impermeability. Therefore, water and microorganisms are allowed to circulate between the third layer of filler 15 and the fourth layer of filler 16, while the upper layer of oxygen-containing gas is prevented from entering the fourth layer of filler 16, thereby the life activities of anaerobic denitrifying bacteria and phosphorus-accumulating bacteria in this area can be ensured.

Appropriate amount of phosphorus and nitrogen fertilizers are required for the growth of plants. The phosphorus in the phosphorus fertilizer and the nitrogen in the nitrogen fertilizer are absorbed by the plants in the form of acid radical ions. However, only part of the fertilizer applied to the soil each year is absorbed by the crops of the season, and the rest is fixed by the soil to form large amount of acidic salt deposits, causing soil compaction. Basin Water may be rich in nitrogen and phosphorus, and both exist in the form of organic phosphorus and organic nitrogen, or inorganic phosphorus and inorganic nitrogen. Organic phosphorus and organic nitrogen are decomposed into inorganic phosphorus, inorganic nitrogen and short carbon chains in vertical subsurface flow constructed wetlands. The formed inorganic phosphorus and inorganic nitrogen mostly exist in water in the form of acid radical ions. Once the contents of nitrogen and phosphorus exceed the plant's requirements, the soil condition will definitely be affected, and acidic salt deposition and soil compaction will also occur. Therefore, after extensive research, the aerobic zone (the first, second and third layers of filler zone) and anaerobic zone (the fourth layer of filler zone) are set up in the vertical subsurface flow constructed wetland, and phosphorus-accumulating bacteria and denitrifying bacteria are add, thereby effectively solving the problem of excessive nitrogen and phosphorus.

The thicknesses of the first layer of filler 13, the second layer of filler 14, the third layer of filler 15 and the fourth layer of filler 16 are all 500 cm, and the total thickness of the fillers is 2000 cm; and said thickness is the most preferable to effectively implement the function of each filler layer. The thickness of the first layer of filler 13 is from 100 to 700 cm, the thickness of the second layer of filler 14 is from 300 to 700 cm, the thickness of the third layer of filler 15 is from 200 to 600 cm, and the thickness of the fourth layer of filler 16 is from 100 to 600 cm.

Another object of the present invention is to provide a device for preventing and controlling pollutants in basin water resources utilization, so as to effectively control the content of pollutants in basin water introduced into the farmland. The device includes a hydrolysis tank 1, a nano-aeration tank 2 and a vertical subsurface flow constructed wetland 3 connected in sequence, which are 4~10 m far from basin revetment.

In the hydrolysis tank 1, aquatic plants, such as duckweed and algae, are crushed, acidized and digested, and then the supernatant is transported into the nano-aeration tank 2.

In the nano-aeration tank 2, the supernatant from the hydrolysis tank 1 is received, and organic matters in the supernatant are degraded, such as long carbon chain organic matters are degraded into short carbon chain organic matters, thereafter the degraded supernatant is fed into the vertical subsurface flow constructed wetland 3 to provide microorganisms with carbon source.

In the vertical subsurface flow constructed wetland 3, the supernatant from the nano-aeration tank 2 is mixed with basin water, and then fed into one or more layers of fillers laid in the vertical subsurface flow constructed wetland 3, where pollutions are degraded or removed, and the treated basin water is transported to the farmland.

In a preferred embodiment, aquatic plants such as duckweed and algae can be salvaged from basin water. The hydrolysis tank 1 is equipped with an agitator 8, so that aquatic plants, such as duckweed or algae, can be crushed to speed up the acidification and digestion process. Preferably, the COD of the treated supernatant of the hydrolysis tank 1 is higher than 200 mg/L.

In a preferred embodiment, an aeration disk 10 is set at the lower part of the nano-aeration tank 2, and an oxygen-containing fluid is introduced through the aeration disk 10 into the nano-aeration tank 2. Furthermore, the oxygen-containing fluid is nano-bubble water or the aqueous solution containing tiny bubbles with a size of 100~500 nm, and dissolved oxygen amount of 10~25 mg/L.

In a preferred embodiment, activated sludge is added into the nano-aeration tank 2, and the weight ratio of the activated sludge to basin water fed into the nano-aeration tank 2 is 1:7, so as to realize high-efficiency decomposition of organic matters and sedimentation of particulate matters.

Preferably, microorganisms are added in the nano-aeration tank 2, and said microorganism is *Delftia* sp.

In a preferred embodiment, the vertical subsurface flow constructed wetland 3 is provided with four layers of fillers from top to bottom:

the first layer of filler 13 adsorbs heavy metals and degrades organic matters;

the second layer of filler 14 adsorbs and fixes heavy metals;

the third layer of filler 15 adsorbs heavy metals, and phosphorus-accumulating bacteria is added in this area to reduce the phosphorus content of basin water to be purified because of the phosphorus-accumulating ability;

the fourth layer of filler 16 adsorbs heavy metals, and phosphorus-accumulating bacteria is allowed to dephosphorize in this area by constructing an anaerobic environment, so its phosphorus-accumulation ability in the third layer of filler 15 is promoted. An baerobic denitrifying bacteria is added to reduce the nitrogen content of basin water to be purified.

Specifically, the first layer of filler 13 is a mixed filler of soil and functional biochar. The mixing ratio is 3:(6~8), and preferably 3:7, the particle size of the filler is 0.10-0.30 cm, and the thickness of the filler is from 100 to 700 cm.

The second layer of filler 14 is a mixed filler of soil, natural zeolite and limestone. The mixing ratio is 1:(2~3):(0.5~1), and preferably 1:2:0.5, the particle size of the filler is 0.08-0.1 cm, and the thickness of the filler is from 300 to 700 cm.

The third layer of filler 15 is a mixed filler of fly ash molecular sieve, Flory diatomaceous earth and biochar. The mixing ratio is 1:(3~4):(1~1.5), and preferably 1:3:1, the particle size of the filler is 0.05-0.08 cm, and the thickness of the filler is from 200 to 600 cm.

The fourth layer of filler 16 is a mixed filler of pebbles and biochar. The mixing ratio is 1:(1~2), and preferably 1:1, the particle size of the filler is 0.30-0.50 cm, and the thickness of the filler is from 100 to 600 cm.

In the present invention, the ratio of different materials in each filler layer is based on the weight thereof.

In a preferred embodiment, wetland plants 6 are planted on the vertical subsurface flow constructed wetland 3 (on the first layer of filler), and said wetland plants 6 are Siberian iris and Zaili flower. Preferably, one of rhamnolipid and (poly) aspartic acid or a combination thereof, preferably the combination of rhamnolipid and aspartic acid, is added into the vertical subsurface flow constructed wetland 3 during the growth process of wetland plants 6, to promote the enrichment of heavy metals in plants, so that the heavy metals in the plant can reach high concentration that the plant can withstand.

In a preferred embodiment, a polar polymer, such as polyaniline film, is filled between the third layer of filler 15 and the fourth layer of filler 16. Phosphorus-accumulating bacteria is added to the third layer of filler, and denitrifying bacteria and phosphorus-accumulating bacteria are added to the fourth layer of filler.

In the present invention, the vertical subsurface flow constructed wetland 3 is equipped with an inlet pipe and an outlet pipe on both sides along its length, and control valves are equipped on the inlet pipe and the outlet pipe. Waste water is fed into the first layer of filler 13 through the inlet pipe, and water from the fourth layer of filler 16 is collected by the outlet pipe. Valves of the inlet pipe and the outlet pipe valves are simultaneously opened, thus the constructed wetland is in a vertical downflow operation mode. The contact area of wastewater and air is greatly increased in the vertical downflow operation mode, which is beneficial to the transmission of oxygen and the purification effect of nitrogen and phosphorus is improved. Moreover, wastewater flows vertically from the surface to the bottom of the filler bed, and during the flow process from top to bottom, wastewater passes through different media layers, thereby achieving purification of heavy metals and suspended solids.

In the present invention, in addition to constructing the device including the hydrolysis tank 1, the nano-aeration tank 2 and the vertical subsurface flow constructed wetland 3, basin water in the river is also pre-treated by adding denitrifying bacteria, and preferably aerobic denitrifying bacteria, such as *Alicaligenes faecalis* or *Thiosphaera pantotropha*.

Preferably, the concentration of denitrifying bacteria in basin water of the river is 5~100 billion/g. It only needs to be inoculated once when basin water is used for irrigation. Basin water to be treated will inevitably be further purified by the addition of denitrifying bacteria, especially aerobic denitrifying bacteria. Meanwhile, the synergistic effect of aerobic denitrifying bacteria and anaerobic denitrifying bacteria added in the vertical subsurface flow constructed wetland will promote the water body purification.

In the present invention, wetland plants such as Siberian iris and Zaili flower, planted in the vertical subsurface flow constructed wetland, has extremely excellent enrichment effect on heavy metals, so can be used to prepare functional biochar, which may be used as a filler for vertical subsurface flow constructed wetlands.

In a preferred embodiment of the present invention, the preparation of functional biochar includes the following steps:

step 1, crushing the plants and carbonizing to obtain activated carbon;

step 2, activating the activated carbon to obtain activated carbon after activation;

step 3, reducing the activated carbon after activation to obtain functional biochar.

In step 1, the whole plant is crushed to particles with a length of 3-5 mm as needed.

Argon is filled in a heating vessel, such as a tube muffle furnace, to obtain an inert environment. After a temperature of 1200° C. is reached in the heating vessel, in which the crushed plant particles are fed, thereafter 1200° C. is maintained for 120 min, and then the temperature is reduced from 1200° C. to 20° C. within 200 min, thereby carbonizing the biomass.

In step 2, the activated carbon is washed with distilled water until the water is clear after washing. In order to activate, 30-50 wt. % zinc chloride is added to the washed activated carbon until the liquid level is higher than the activated carbon, and the mixture is stirred, microwave radiated for a set time, and then soaked at 25° C. overnight. The activated carbon after activation is washed to neutral, dried and ready for use.

Bio-oil produced by carbonization in step 1 is detached from the internal pores of the activated carbon through the activation, thereby preventing bio-oil from clogging the internal pores of the activated carbon and the decrease of the adsorption and photocatalytic effects.

During the activation, a microwave of 300 W-700 W is used to radiate for 20~30 min.

In step 3, the activated carbon after activation is dried, and a solution of sodium borohydride is added dropwise at a low temperature to reduce the metal ions in the activated carbon, for example, ferrous ions is reduced to iron at zero valence. Preferably, the activation reaction is promoted by shaking at 100-140 rpm with a shaker. The concentration of sodium borohydride solution is 10 mmol/L~30 mmol/L.

The activated carbon is washed with distilled water and dried. After cooling to room temperature, the activated carbon after reduction is filled into a container, sealed, and heated at 180~680° C. in an oven for 10~60 minutes, and then cooled to room temperature to give functional biochar (that is, in situ self-reduction supported activated carbon).

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode. After the biochar is activated, the ash tar on its surface is removed, and the metal ions are exposed and then is reduced by sodium borohydride, thereby obtaining activated carbon loaded with heavy metals, which not only has inherent performances of activated carbon, such as regulating urban hydraulics, increasing soil fertility, maintaining nutrient and improving microbial habitat, but also has the functions of electric capacity and catalysis.

EXAMPLE

Example 1: A Method for Preventing and Controlling Pollutants in Basin Water Resources Utilization As shown in FIG. 1, provide a hydrolysis tank, a nano-aeration tank and a vertical subsurface flow constructed wetland connected in sequence. The duckweed and algae are salvaged in basin water, crushed in the hydrolysis tank, and then acidified and digested. After the COD of the supernatant of the hydrolysis tank is higher than 200 mg/L, the supernatant of the hydrolysis tank is fed into the nano-aeration tank. In the nano-aeration tank, long chain organic matters are degraded into short carbon chain organic matters by microorganisms *Delftia* sp and nano-bubble water, and the amount of dissolved oxygen in the nano-aeration tank is maintained at 4-6 mg/L. Water from the nano-aeration tank is mixed with basin water at a ratio of 1:15, and then is fed into the vertical subsurface flow constructed wetland, which is in vertical downflow operation mode.

There are four layers of fillers in the vertical subsurface flow constructed wetland: the first layer of filler at 0-500 cm is a mixed filler of soil and functional biochar, wherein the mixing ratio is 3:7 and the particle size of the filler is 0.10-0.30 cm, and the wetland plants, Siberian iris and Zaili flower, are planted on it; the second layer of filler at 500-1000 cm is a mixed filler of soil, natural zeolite and limestone, wherein the mixing ratio is 1:2:0.5 and the particle size of the filler is 0.08-0.1 cm; the third layer of filler at 1000-1500 cm is added phosphorus-accumulating bacteria *Pseudomona alcaligenes*, and the third layer of filler is a mixed filler of fly ash molecular sieve (Henan Mingze Environmental Protection Technology Co., Ltd., 13× molecular sieve), Flory diatomaceous earth and biochar, wherein the mixing ratio is 1:3:1 and the particle size of the filler is 0.05-0.08 cm; the fourth layer of filler at 1500-2000 cm is added anaerobic denitrifying bacteria and phosphorus-accumulating bacteria *Pseudomona alcaligenes*, and the fourth layer of filler is a mixed filler of pebbles and biochar, wherein the mixing ratio is 1:1 and the particle size of the filler is 0.30-0.50 cm. Between the third and the fourth layers of filler is filled a polar polymer polyaniline film (obtained according to "Wang Hui. Electrochemical synthesis of polyaniline film photoelectric properties [J]. Journal of Xi'an Jiaotong University, 1999, (08): 107-108").

Example 2~18

Implementing the method for preventing and controlling pollutants in basin water resources utilization through the hydrolysis tank, nano-aeration tank and vertical subsurface flow constructed wetland, in the same manner as in Example 1, with the differences are shown in Table 1 below.

TABLE 1

| Example number | Differences from Example 1 (the substance and order related to the ratio is the same as those in Example 1) |
|---|---|
| Example 2 | The filler in first layer is soil |
| Example 3 | The mixing ratio in the first layer of filler is 1:1 |
| Example 4 | The particle size of the filler in first layer is 0.01~0.08 cm |
| Example 5 | The particle size of the filler in first layer is 5~30 mm |
| Example 6 | The second layer of filler is soil and limestone in original proportion |
| Example 7 | The second layer of filler is soil and natural zeolite in original proportion |
| Example 8 | The mixing ratio in the second layer of filler is 1:1:2 |
| Example 9 | The particle size of the filler in second layer is 0.01-0.05 cm |
| Example 10 | The particle size of the filler in second layer is 1~10 mm |
| Example 11 | The third layer of filler is fly ash molecular sieve and biochar in original proportion |
| Example 12 | The third layer of filler is fly ash molecular sieve and Flory diatomaceous earth in original proportion |
| Example 13 | The mixing ratio in the third layer of filler is 1:1:1 |
| Example 14 | The particle size of the filler in third layer is 0.005-0.03 cm |
| Example 15 | The filler of fourth layer is pebbles |
| Example 16 | The particle size of the filler in fourth layer is 0.001~0.30 cm |
| Example 17 | No phosphorus-accumulating bacteria is fed in the third and the fourth layers of filler |
| Example 18 | No anaerobic denitrifying bacteria is fed in the fourth layer of filler |

Experimental Example

The effects of the pollutant control methods in Examples 1~18 are evaluated by measuring the content of heavy metals, $COD_{Cr}$, total phosphorus, total nitrogen and pH in the water before and after the treatment. The results are shown in Table 2.

The water used for evaluation is collected from river water. $Pb(NO_3)_2$, $Zn(NO_3)_2$, $Na_3PO_4$ and $NaNO_3$ are added to the water, so that the concentration of Pb in the water is 1.27 mg/L, the concentration of Zn is 5.88 mg/L, and the total content of P is 4.86 mg/L, the total content of N is 10.33 mg/L, the concentration of $COD_{Cr}$ is 107 mg/L, and pH is 7.16. The treated water is fed directly into the constructed wetland with the inflowing rate of 2.5 L/min and the outflowing rate is 2.5 L/min. The treatment time is 12 h, and the water quality is measured after 12 h.

TABLE 2

| Example number | Pb (μg/L) | Zn (mg/L) | $COD_{Cr}$ (mg/L) | Total P (mg/L) | Total N (mg/L) | pH |
|---|---|---|---|---|---|---|
| Example 1 | 75 | 1.63 | 95 | 1.67 | 3.59 | 7.15 |
| Example 2 | 99 | 2.01 | 184 | 2.05 | 3.78 | 7.11 |
| Example 3 | 81 | 1.74 | 104 | 1.81 | 3.92 | 7.20 |
| Example 4 | 50 | 1.56 | 90 | 2.27 | 4.11 | 6.89 |
| Example 5 | 88 | 1.80 | 126 | 1.75 | 3.74 | 7.10 |
| Example 6 | 217 | 2.81 | 103 | 1.84 | 3.43 | 7.19 |
| Example 7 | 33 | 1.32 | 108 | 2.48 | 4.33 | 6.15 |

TABLE 2-continued

| Example number | Pb (µg/L) | Zn (mg/L) | COD$_{Cr}$ (mg/L) | Total P (mg/L) | Total N (mg/L) | pH |
|---|---|---|---|---|---|---|
| Example 8 | 132 | 2.46 | 99 | 1.79 | 3.67 | 7.23 |
| Example 9 | 31 | 1.05 | 111 | 2.28 | 4.15 | 7.14 |
| Example 10 | 84 | 1.92 | 105 | 2.03 | 3.82 | 7.17 |
| Example 11 | 87 | 1.65 | 105 | 2.33 | 4.05 | 7.10 |
| Example 12 | 107 | 1.57 | 94 | 2.01 | 3.75 | 7.12 |
| Example 13 | 94 | 1.75 | 101 | 2.21 | 3.91 | 7.14 |
| Example 14 | 63 | 1.49 | 93 | 1.92 | 3.64 | 7.19 |
| Example 15 | 112 | 1.81 | 98 | 1.95 | 3.72 | 7.10 |
| Example 16 | 103 | 1.64 | 104 | 2.07 | 3.93 | 7.12 |
| Example 17 | 84 | 1.73 | 117 | 2.89 | 4.11 | 7.33 |
| Example 18 | 70 | 1.62 | 122 | 2.41 | 5.04 | 7.19 |

As can be seen from Table 2, the decrease in the proportion of functional biochar in the first layer of filler mainly affects the adsorption of heavy metals and the reduction of COD values. When the size of the filler becomes smaller, it is beneficial to the adsorption of heavy metals, because it may affect the air entering the water, thereby reducing the ability of microorganisms to dephosphorize and denitrify. When the size of the filler becomes larger, the dephosphorization and the denitrification of microorganisms are promoted, thus the content of phosphorus and nitrogen decreases, but it has certain adverse effect on heavy metal adsorption.

The decrease in the proportion of natural zeolite in the second layer of filler mainly affects the adsorption and fixation of heavy metals, which causing higher content of heavy metals in the treated system. The pH in the system is affected by the decrease in the proportion of limestone, and the efficiency of the dephosphorization and the denitrification of microorganisms is reduced, causing higher contents of total nitrogen and total phosphorus in the water. The decrease in the particle size of the filler can significantly improve the adsorption of heavy metals, but it is unfavorable for the regulation of COD, total nitrogen and total phosphorus due to the obstruction of gas flow.

In the third layer of filler, Flory diatomaceous earth is beneficial to microorganisms and its dephosphorization and denitrification, and thus the effect of dephosphorization and denitrification decreases as the proportion of Flory diatomaceous earth decreases. The removal of biochar with excellent adsorption performance has certain impact on the level of heavy metals. And the adsorption of heavy metals can be significantly improved by decreasing the particle size of filler.

In the fourth layer of filler, the level of heavy metals is slightly increased by replacing activated carbon with pebbles, since activated carbon has better adsorption to heavy metals than pebbles. The adsorption performance can be enhanced by decreasing the particle size of the filler, but close packing is not beneficial to the dephosphorization and the denitrification of microorganisms, therefore, the total phosphorus and total nitrogen levels increase slightly as the particle size of the filler in fourth layer decreases.

Anaerobic denitrifying bacteria and phosphorus-accumulating bacteria have the functions of denitrification and dephosphorization, respectively. For the above reason, the total nitrogen and total phosphorus in the water body are significantly increased when both of them are not added to the water.

In the description of the present invention, it should be noted that the orientation or positional relationship indicated by the terms "over", "under", "inner", "outer", "front" and "rear" is based on the working state of the present invention.

and is only for the convenience of describing the present invention and simplifying the description, rather than indicating or implying that the device or element referred to must have a specific orientation, be constructed and operated in a specific orientation, and therefore cannot be construed as limiting the present invention.

The present invention has been described in detail with reference to specific embodiments and exemplary examples, but these descriptions should not be construed as limiting the present invention. Those skilled in the art should understand that, without departing from the spirit and scope of the present invention, various equivalent replacements, modifications, or improvements can be made to the technical solution and its implementation of the present invention, all of which fall within the scope of the present invention. The protection scope of the present invention is subject to the appended claims.

What is claimed is:

1. A method for preventing and controlling pollutants in reuse of reclamation process-treated water previously collected from a prior use in a liquid-holding container, wherein the method includes:
    providing a hydrolysis tank (1), a nano-aeration tank (2) and a subsurface flow constructed wetland (3) connected in sequence;
    feeding the reclamation process-treated water into the hydrolysis tank (1) and adding aquatic plants for acidification and digestion to yield a treated reclamation process-treated water, then transporting the supernatant of the treated reclamation process-treated water into the nano-aeration tank (2);
    treating the supernatant from the hydrolysis tank (1) in an aerobic environment in the nano-aeration tank (2), and transporting the treated supernatant to the subsurface flow constructed wetland (3);
    mixing the supernatant treated by the nano-aeration tank (2) with the treated reclamation process-treated water and feeding them into the subsurface flow constructed wetland (3), and also into one or more layers of fillers laid in the subsurface flow constructed wetland (3) to degrade or remove pollutants.

2. The method according to claim 1, characterized in that, the hydrolysis tank (1) is equipped with an agitator (8) to crush aquatic plants, and
    the COD of the supernatant of the hydrolysis tank (1) is higher than 200 mg/L.

3. The method according to claim 1, characterized in that, an aeration disk (10) is set at the lower part of the nano-aeration tank (2), and an oxygen-containing fluid is introduced through the aeration disk (10) into the nano-aeration tank (2);
    the oxygen-containing fluid is nano-bubble water or the aqueous solution containing tiny bubbles with a size of 100~500 nm and dissolved oxygen amount of 10~25 mg/L.

4. The method according to claim 1, characterized in that, activated sludge is added into the nano-aeration tank (2), and the weight ratio of the activated sludge to the reclamation process-treated water fed into the nano-aeration tank (2) is 1:7; and/or
    microorganisms that can degrade organic matters are added in the nano-aeration tank (2), and said microorganism is *Delftia* sp.

5. The method according to claim 1, characterized in that, the subsurface flow constructed wetland (3) is provided with four layers of fillers from top to bottom:

the first layer of filler (13) is a mixed filler of soil and functional biochar, which adsorbs heavy metals and degrades organic matters;

the second layer of filler (14) is a mixed filler of soil, natural zeolite and limestone, which adsorbs and fixes heavy metals;

the third layer of filler (15) is a mixed filler of fly ash molecular sieve, Flory diatomaceous earth and biochar, which adsorbs heavy metals, and phosphorus-accumulating bacteria is added in this area to reduce the phosphorus content of the reclamation process-treated water to be purified;

the fourth layer of filler (16) is a mixed filler of pebbles and biochar, which adsorbs heavy metals, and the phosphorus-accumulating bacteria is allowed to release phosphorus in this area by constructing an anaerobic environment.

6. The method according to claim 5, characterized in that, the mixing weight ratio of soil and functional biochar in the first layer of filler (13) is 3:(6~8), and the particle size of the filler is 0.10-0.30 cm; and/or the mixing weight ratio of soil, natural zeolite and limestone in the second layer of filler (14) is 1:(2~3):(0.5~1), and the particle size of the filler is 0.08-0.1 cm; and/or the mixing weight ratio of fly ash molecular sieve, Flory diatomaceous earth and biochar in the third layer of filler (15) is 1:(3~4):(1~1.5), and the particle size of the filler is 0.05-0.08 cm; and/or the mixing weight ratio of pebbles and biochar in the fourth layer of filler (16) is 1:(1~2), and the particle size of the filler is 0.30-0.50 cm.

7. The method according to claim 5, characterized in that, wetland plants (6) are planted on the first layer of filler (13);

one of rhamnolipid and polyaspartic acid or a combination thereof, the combination of rhamnolipid and aspartic acid, is added during the growth process of wetland plants (6).

8. The method according to claim 5, characterized in that, a polar polymer, such as polyaniline film, is filled between the third layer of filler (15) and the fourth layer of filler (16), so that anaerobic environment is formed in the area where the fourth layer of filler (16) is located;

anaerobic denitrifying bacteria is added to the fourth layer of filler (16);

the phosphorus-accumulating bacteria is added to the fourth layer of filler (16).

9. The method according to claim 1, characterized in that, the subsurface flow constructed wetland (3) is equipped with an inlet pipe and an outlet pipe on both sides along its length, and waste water is fed into the first layer of filler (13) through the inlet pipe, the water from the fourth layer of filler (16) is collected by the outlet pipe, and simultaneously, valves of the inlet pipe and the outlet pipe are opened, thus the constructed wetland is in a vertical downflow operation mode.

10. A device for preventing and controlling pollutants in reuse of reclamation process-treated water previously collected from a prior use in a liquid-holding container, wherein the device includes a hydrolysis tank (1), a nano-aeration tank (2) and a subsurface flow constructed wetland (3) connected in sequence, which are 4~10 m far from basin revetment;

in the hydrolysis tank (1), aquatic plants are crushed, acidized and digested, and then the supernatant is transported into the nano-aeration tank (2);

in the nano-aeration tank (2), the supernatant from the hydrolysis tank (1) is received, and organic matters in the supernatant are degraded, such as long carbon chain organic matters are degraded into short carbon chain organic matters, thereafter the degraded supernatant is fed into the subsurface flow constructed wetland (3) to provide microorganisms with carbon source;

in the subsurface flow constructed wetland (3), the supernatant from the nano-aeration tank (2) is mixed with the reclamation process-treated water, and then is fed into one or more layers of fillers laid in the subsurface flow constructed wetland (3), where pollutions are degraded or removed to yield a treated reclamation process-treated water, and the treated reclamation process-treated water is transported to the farmland.

\* \* \* \* \*